United States Patent [19]

Stearns

[11] Patent Number: 4,761,691
[45] Date of Patent: Aug. 2, 1988

[54] METHOD FOR CONTROLLING VIDEO SIGNAL TIME-BASE CORRECTORS

[75] Inventor: John C. Stearns, San Jose, Calif.

[73] Assignee: Ampex Corporation, Redwood City, Calif.

[21] Appl. No.: 1,716

[22] Filed: Jan. 9, 1987

[51] Int. Cl.$^4$ .......................... H04N 9/89; H04N 5/95
[52] U.S. Cl. .................................. 358/311; 358/320; 358/337
[58] Field of Search .................... 358/311, 320–326, 358/337–339, 17, 148; 360/14.1, 36.1, 36.2

[56] References Cited

U.S. PATENT DOCUMENTS 4,549,227 10/1985 Hashimoto et al. ............ 358/320 X
4,668,999 5/1987 De La Cierva, Sr. et al. .... 358/337 X
4,709,277 11/1987 Ninomiya et al. ............. 360/14.1 X Primary Examiner—W. B. Perkey
Attorney, Agent, or Firm—Robert Krebs; Bradley Perkins; Richard Lange

[57] ABSTRACT

A video recording system employs an editing device to communicate schedules of instructions to a videotape recorder control system which, in turn, communicates selected ones of the instructions from the schedules to a time-base corrector so that the time-base corrector automatically controls and adjusts video signal parameters at the output of the videotape recorder in accordance with an appropriate one of the schedules. Operation of the system includes the steps of storing schedules of instructions in the editing device, communicating the schedules of instructions to a videotape recorder control system connected to a time-base corrector, storing time lines of the instructions in the videotape recorder control system, and operating the time-base corrector to manipulate video signal information at the output of a recorder mechanism according to the time line schedules.

26 Claims, 3 Drawing Sheets

METHOD FOR CONTROLLING VIDEO SIGNAL TIME-BASE CORRECTORS

BACKGROUND OF THE INVENTION

1. Field of the Invention

The present invention generally relates to a method and system for manipulating video signal parameters and, more particularly, to a method and system that is especially useful for manipulating video signal parameters relating to video signals that have been recorded on videotape.

2. State of the Art

In modern video technology, it is commonplace to extensively adjust and modify video signal information on videotape for broadcasting and other teleproduction purposes. For example, videotape recorders are commonly used to electronically splice new video information onto videotape in the midst of existing information and to successively add video information at the end of other information. In such operations, the added video information may originate from other videotape recorders, from broadcast sources, or directly from live sources. Also, video signal information replayed from videotape recorders can be modified to provide special effects.

In video output signal information from videotape recorders, it is typical to encounter time displacement errors. While such errors can be introduced from various mechanical and electronic sources during recording and playback processes, there are four typical causes: tape-motion irregularities, head-motion irregularities, tape-dimension changes, and skew errors. These factors can cause variations in the mechanical scanning speed and in the linear speed of videotape through videotape recorders. Upon playback of videotape, time displacement errors can produce picture instabilities such as jitter and flutter and can cause wrong colors, lack of color, or unstable color in pictures.

To alleviate time-displacement errors in output signals from videotape recorders, it is well known to use time-base correctors. Generally speaking, time-base correctors correct time-displacement errors by synchronizing video output signals with stable timing signals to provide stable output signals. Many modern time-base correctors include analog-to-digital conversion circuits to digitize video signal information, integrated circuit memory elements to store the digitized signals, synchronizing circuitry to coordinate output signals from the time-base corrector with stable timing signals generated from independent (i.e., off-tape) sources, and digital-to-analog conversion circuitry to convert digital output signals to analog form for final output. One advantage often provided by time-base correctors is that the video signal information can remain stored in memory for extended periods without degradation and can be recovered by the synchronizing circuitry at selected times, and at controlled rates, in synchronization with stable timing signals that are generated independently of the videotape.

Time-base correctors are used in various systems to provide output signals that are stable, properly synchronized with signals from independent sources, and essentially free from phase differences or other timing displacement errors and irregularities. For example, modern time-base correctors are sometimes employed to manipulate output signals from videotape recorders of the helical scan type so that the manipulated output signals are satisfactory for broadcasting. Also, time-base correctors can be used to manipulate signal information from other sources, such as satellite transmissions, to overcome time displacement errors and to achieve other effects. Further, it is known in teleproduction systems to provide time-base correctors at the input to videotape recorder devices; in such systems, the time-base correctors condition or modify video signal information prior to transmittal of the information to the input of the recorders.

Modern time-base correctors, such as the ones included in advanced video processors sold under the trademark "Zeus" by Ampex Corporation of Redwood City, California, often include controls to manipulate and adjust various video signal parameters including ones which are not directly related to time-base errors. For example, time-base correctors may provide adjustments for video level, black level, chrominance level, chrominance phase, output synchronization to burst subcarrier phase, subcarrier phase, horizontal phase, input burst crossing select phase, horizontal blanking, vertical picture position, horizontal picture position, adaptive comb filter, and frame positioning. Some time-base correctors, including those used in broadcasting studios, may provide functions in addition to those mentioned above. Among the most common extra functions are dropout compensation, heterodyne operation, and system phasing controls. Manipulation and adjustment of such video signal parameters are made to enhance video picture quality and, in some situations, to add special effects to video images.

According to current practice, controls on time-base correctors to manipulate and adjust video signal parameters are directly linked to circuits for controlling the parameters. Thus, it is common for some video signal parameters to be manually adjusted by setting potentiometers on the time-base correctors or associated control panels.

It is also known in the teleproduction art to use editing devices to simultaneously control operation of several videotape recorders to, thereby, facilitate editing of videotapes. Through use of such editing devices, an operator of a teleproduction system can fairly easily produce, for example, edited videotapes having portions originating from several videotape recorders as well as outside signal sources. In such teleproduction systems employing several videotape recorders controlled by a single editing device, time-base correctors are usually separately associated with each of the videotape recorders. In such systems, the time-base correctors are usually controlled directly via the videotape recorders or through control panels associated with the videotape recorders. Thus, it is known to provide electronic communication between videotape recorders and time-base correctors, usually via serial data buses, for adjustment of operation of the time-base correctors.

In present practice, many of the controls and functions that are provided in time-base correctors are not used to their full potential. For example, in typical teleproduction systems, substantial delays often exist between the time that adjustments to video signals might be made and the time that adjustments are actually made, if at all, through control of time-base correctors. The fact that teleproduction system operators often delay or neglect adjustments that could enhance the output quality of video signal information is primarily a result of the fact that, in present teleproduction systems, adjustment of video signal parameters is often inconvenient, complex and frequently impractical to even attempt in "real time" (i.e., while a videotape is playing or while a video signal is being received). Further, because many of the controls for video signal parameters are of the analog type, manual adjustment of such controls is imprecise since exact levels cannot be repetitively set from machine to machine. Moreover, manual adjustment of time-base correctors may introduce operator error, particularly in teleproduction systems that include several videotape recorders which are to be operated simultaneously. Thus, operators of teleproduction systems often forgo, or delay, adjustments to video signal parameters to the detriment of video picture quality.

In light of conventional practice, it can be appreciated that a need exists for improvements in the manipulation of video signal parameters through the use of time-base correctors in complex videotape recording and playback systems. Specifically, there exists a need for methods and systems that assure that adjustments to time-base correctors can be conveniently and precisely implemented during replay of videotape from videotape recorders associated with the time-base correctors. Even more particularly, it may be seen that there exists a need for improvements in the control of video signal information parameters in systems wherein a single videotape editing device is used to schedule and control a plurality of videotape recorders and associated time-base correctors that often must operate simultaneously.

BRIEF SUMMARY OF THE INVENTION

To overcome the shortcomings of current practice, the present invention generally provides a system and method employing a videotape editing device to communicate organized preselected schedules of instructions to one or more time-base correctors so that parameters of video signal information are automatically adjusted at the time-base correctors according to the schedules. The present invention provides, for example, a method for synchronized control of a plurality of time-base correctors with a single videotape editing device comprising the steps of storing preselected schedules of instructions in the editing device, communicating selected instructions from the schedules to selected time-base correctors, and operating the selected ones of the time-base correctors, either concurrently or in serial order, to adjust video signal information according to the stored schedules of instructions.

The present invention further provides a method for controlling a time-base corrector with an editing device via a videotape recorder. This method comprises the steps of storing preselected schedules of instructions in the editing device, communicating the schedules of instructions to the videotape recorder, establishing a time line of the instructions in the recorder, communicating selected ones of the instructions from the time line to the time-base corrector paired with the recorder, and adjusting video signal information controlled by the time-base corrector according to the communicated instructions.

The present invention also generally provides a system employing a single videotape editing device to schedule and control at least two time-base correctors via associated videotape recorders. The editing device in this embodiment includes means to store preselected schedules of digital instructions that determine video signal information levels and means to communicate selected ones of said schedules to each of the videotape recorders. In turn, the videotape recorders communicate selected instructions from the schedules to time-base correctors paired with the recorders to adjust video signal information levels at the output of each of the recorders.

An important advantage of the present invention is that it provides the capability, prior to replay of the signal information from videotape, of scheduling adjustments to video signal parameters in terms of time-base corrector events and, further, provides the capability of automatically executing scheduled adjustments by one or more time-base correctors after replay is initiated. Thus, the present invention substantially improves the effectiveness of use of time-base correctors in video production systems.

Another advantage of the present invention is that it provides the capability of rapidly and precisely adjusting video signal parameters to selected levels, and in accordance with a selected schedule, for an array of time-base correctors that operate either sequentially or concurrently with one another. Thus, the present invention substantially simplifies the operation of complex videotape recording and playback systems, minimizes the need to manually make adjustments of time-base correctors in such systems, and provides the capability of precisely implementing such adjustments in real time (i.e., while a videotape is playing or while a video signal is being received), even to the extent of selecting a particular frame, or group of frames, of video signal information at which such adjustments are to be made.

Still another advantage of the present invention is that it provides the capability to schedule time-base corrector events to modify video signal information on one videotape to produce information on a second videotape that is free of time-displacement error and has the desired video enhancements while the information on the original videotape remains unaltered.

Yet another advantage of the present invention is that information from two or more videotapes can be readily combined according to predetermined schedules such that video signal information from one videotape is modified and adjusted while the original videotape information remains unaltered and is accompanied by a record of the changes made to the original video information.

Still another advantage of the present invention is that it can be readily used in teleproduction studios without requiring substantial additional wiring or special cables; this feature is of substantial significance in teleproduction studios that employ numerous time-base correctors located remotely from editing devices.

The preceding and other features and advantages of the present invention can be readily ascertained by reference to the following description and attached drawings which illustrate preferred embodiments of the present invention.

DETAILED DESCRIPTION OF THE PREFERRED EMBODIMENT

Figure 1:
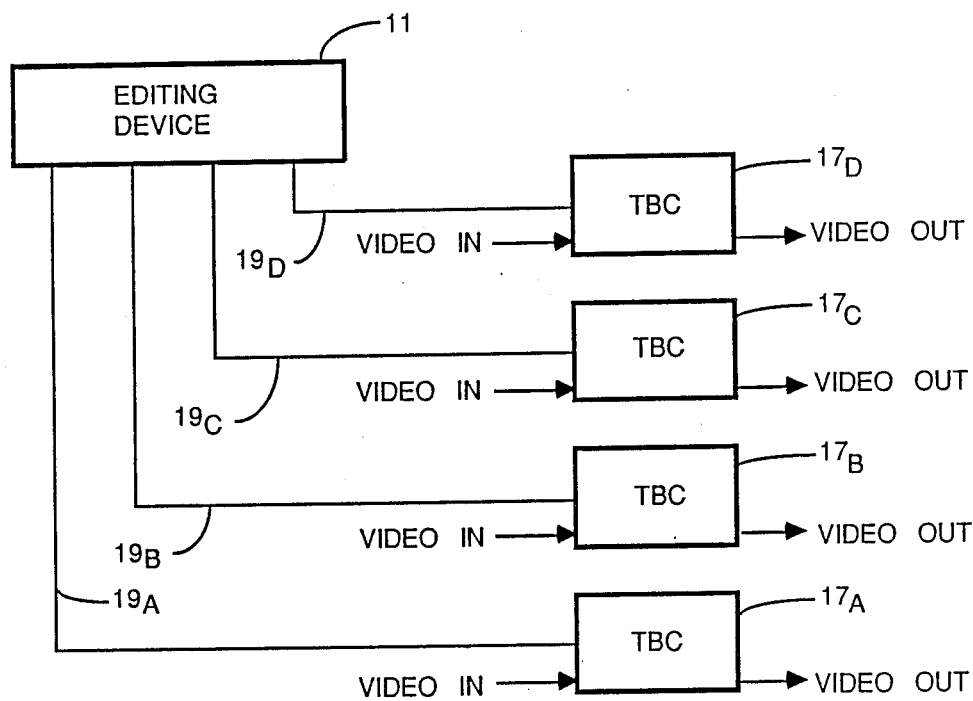
FIG. 1 is a functional block diagram of a generalized embodiment of a system according to the present invention.

FIG. 1 generally shows a system including a videotape editing device 11 operatively connected to a plurality of time-base correctors 17A-D via respective data buses 19A-D. Editing device 11 in FIG. 1 can generally be understood to be a conventional device for controlling teleproduction systems. The editing device can be, for example, the one sold under the trademark "ACE Editor" by Ampex Corporation of Redwood City, California. As will be described in further detail in the following, editing device 11 is programmed to receive and store a schedule of commands that are to be subsequently communicated to time-base correctors 17A-D. For example, in operation of a system that includes only two time-base correctors 17A and 17B editing device 11 may instruct time-base corrector 17A to begin certain operations at a predetermined time and then instruct time-base corrector 17B to begin certain other operations at a second predetermined time. In such a system, the time-base correctors 17A and 17B may execute instructions concurrently.

The instructions in the schedule held in editing device 11 to control operation time-base correctors 17A-D are stored in conventional buffers or, alternatively, in other memory elements. In the preferred embodiment, each buffer includes a section that stores the time at which a requested command is to be executed and a section that provides storage of the command. Preferably, execution times are designated in terms of frames. In practice, a time source for the buffers can be an internal timer or an external timer such as a videotape recorder tape timer.

Data buses 19A-19D in FIG. 1 can be understood to be conventional devices. For example, the data buses can be of the type approved by the Society of Motion Picture and Television Engineers (SMPTE) that employ signaling rates and protocols described in SMPTE proposed standards PH22.207M and RP113 published in the *Journal of the Society of Motion Picture and Television Engineers,* September, 1982. According to those proposed standards, the transmission signaling rate is 38.4K-baud, and each transmitted character consists of a start bit, eight data bits, and a parity bit.

Time-base correctors 17A-D are also conventional devices of the type that provide digital control of at least some video signal parameters. For example, the time-base correctors can include devices sold under the trademark "Zeus" by Ampex Corporation. Preferably, each of the time-base correctors includes means to controllably adjust at least several of the following video signal parameters: video level, black level, chrominance level, chrominance phase, output synchronization to burst subcarrier phase, subcarrier phase, horizontal phase, input burst crossing select phase, and horizontal blanking, vertical picture position, horizontal picture position, adaptive comb filter, and frame positioning. In addition, each of the time-base correctors 17A-D might include controls for functions such as heterodyne operation and system phasing controls.

As further shown in FIG. 1, each time-base corrector 17A-D receives video input signal information and provides video output signals. The input signals can be understood to each originate at a different source. The output signals are manipulated and adjusted by the respective time-base correctors 17A-D in accordance with the controls provided on the recorders. The timing and degree of manipulation and adjustment of the signals is determined by the schedules of instructions communicated to the respective time-base correctors by editing device 11.

Figure 2:
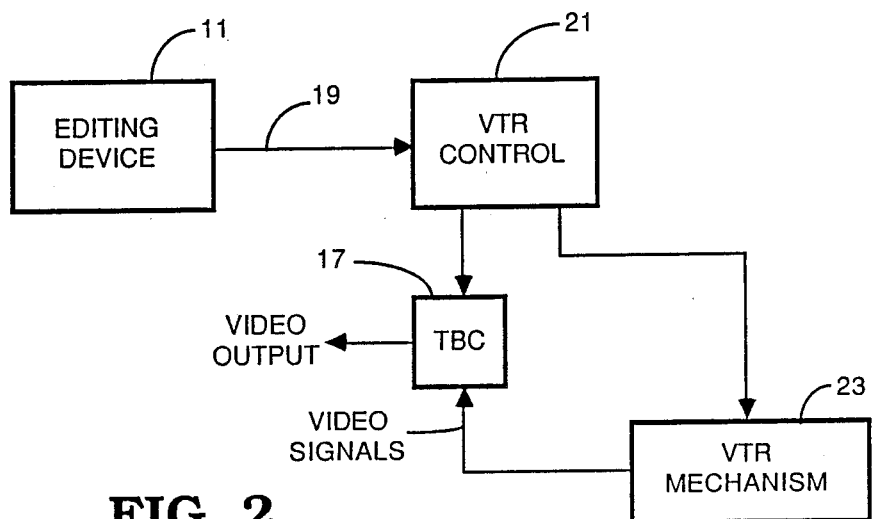
FIG. 2 is a functional block diagram of another generalized embodiment of a system according to the present invention.

In the embodiment shown in FIG. 2, which is another simplified version of the preferred embodiment, videotape editing device 11 is connected by data bus 19 to a control system 21 that, in turn, is operatively connected to a time-base corrector 17 and to a videotape recorder mechanism 23. Time-base corrector 17 and data bus 19 of FIG. 2 are typical of the devices shown in FIG. 1 and, therefore, are given the same reference number but without the subscript. Control system 21 is a conventional control system such as included in the device known as the Ampex VPR-3 videotape recorder sold by Ampex Corporation of Redwood City, California. Because such controls are often integral with videotape recorder mechanisms, they may sometimes be referred to as "local" controls. It is a feature of the system that control system 21 also has the capability to store a schedule of instructions to control operation of videotape recorder mechanism 23 and time-base corrector 17. Videotape recorder mechanism 23 is also a conventional mechanism for recording and playback of videotape. As shown in FIG. 2, the recorder mechanism is connected to time-base corrector 17 such that video signals produced upon replay of videotape through the mechanism are transmitted to the time-base corrector for manipulation. The manipulated signals, whose parameters and timing are adjusted and controlled by time-base corrector 17, are labelled video output signals in FIG. 2.

In operation of the system of FIG. 2, schedules of instructions are stored in editing device 11 to separately control operation of videotape recorder mechanism 23 and time-base corrector 17. Upon commencement of operation of the system, the schedules that are initially compiled in editing device 11 are communicated to control system 21 wherein the instructions are again stored in formats referred to herein as time lines. As will be explained in further detail below, a time line for time-base corrector 17 is separate from the time line for recorder mechanism 23; as a result, tasks for time-base corrector 17 can be scheduled concurrently with tasks for recorder mechanism 23. In conventional practice, there is generally no substantial capability in either recorder mechanism 23 or time-base corrector 17 for storage of the instructions; thus, execution of instructions occurs essentially simultaneous with transmittal of instructions from the time lines in control system 21. In current operating systems, there is an eight frame constant delay during transmission which is anticipated and automatically compensated for during operation of the system. Upon execution of the instructions from the time line for time-base corrector 17, the video signals produced by recorder mechanism 23 are manipulated and adjusted For example, time-base corrector 17 adjustably controls the chrominance phase and level of the video signals from recorder mechanism 23.

Figure 3:
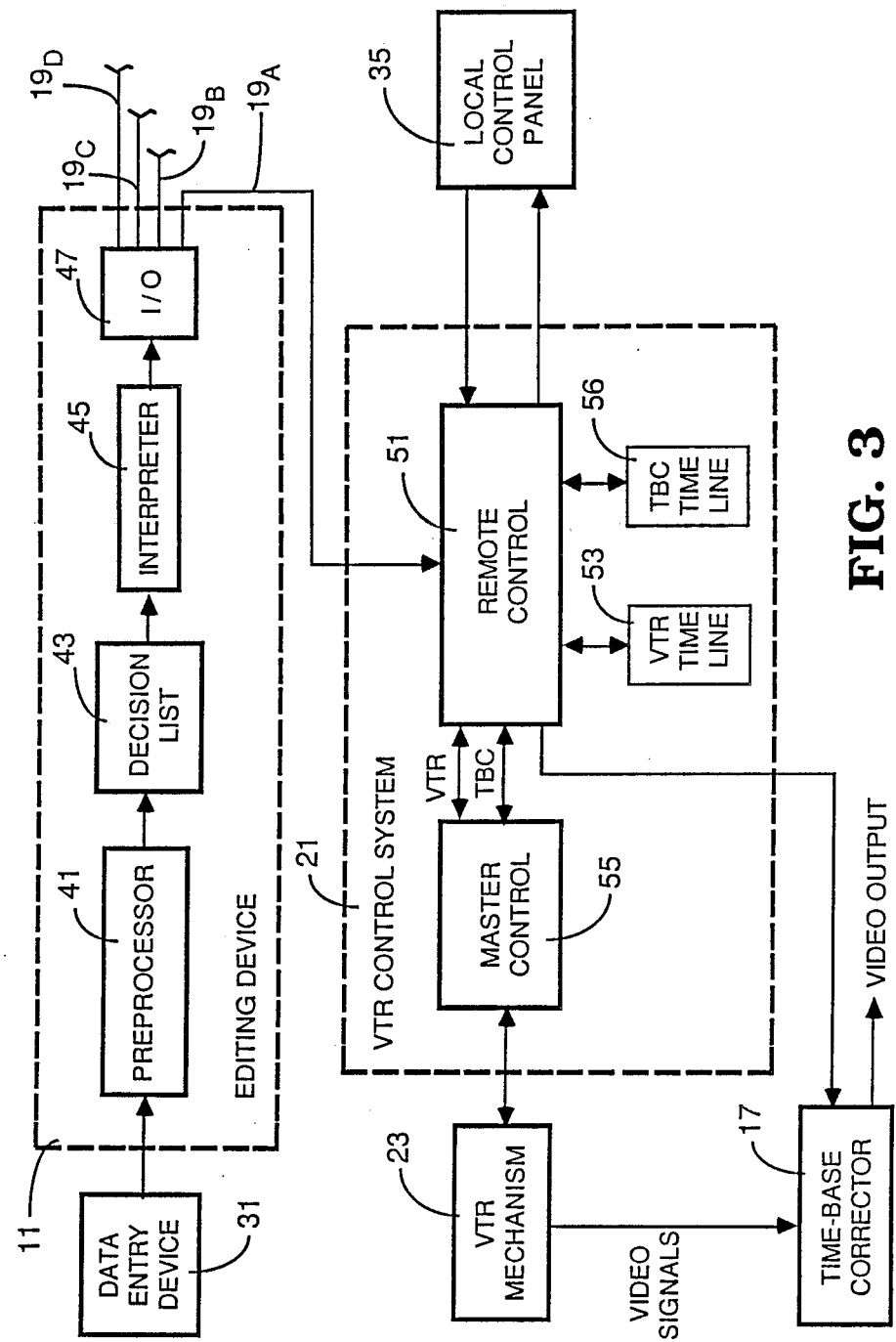
FIG. 3 is a functional block diagram that illustrates details of the system of FIG. 2.

Referring now to FIG. 3, there is shown a system that is exemplary of a preferred embodiment of a system wherein time-base corrector 17 is connected to manipulate and adjust parameters of video signals that are replayed from videotape by recorder mechanism 23. The adjusted video signal information is designated as video output. In the system as shown, editing device 11 is connected between a data entry device 31 and control system 21. Control system 21 is also connected to a local control panel 35, to time-base corrector 17, and to recorder mechanism 23. The editing device 11 and control system 21 in FIG. 3 can be understood to be the same devices as shown in FIG. 2; however, in FIG. 3, certain of the components of editing device 11 and control system 21 are further illustrated.

Data entry device 31 in FIG. 3 is a conventional microprocessor-based machine, including a keyboard and display, adapted to allow manual input of instructions to editing device 11 according to a preselected format.

Local control panel 35 in FIG. 3 is a conventional device that is typically used in conjunction with videotape recorders and time-base correctors to provide manual adjustment of controls for both recorders and correctors from remote locations. In practice, control panel 35 includes display devices that indicate the settings of the various controls either in an analog or digital format. Typically, control panel 35 provides manual control of time-base corrector functions such as video level, black level, chrominance level, chrominance phase, output synchronization to burst subcarrier phase, subcarrier phase, horizontal phase, input burst crossing select phase, horizontal blanking, vertical picture position, horizontal picture position, adaptive comb filter, and frame positionings In the preferred embodiment, local control panel 35 includes controls that are digitally calibrated so that a setting of a certain value at one control panel produces the same result as an identical setting on other panels of the same type.

The components of editing device 11 in FIG. 3 will now be described. Generally speaking, editing device 11 includes a conventional preprocessor 41 to assure compatibility with input signals from data entry device 31. Editing device 11 also, includes conventional circuitry 43 for compiling a decision list of the input instructions. For purposes of emphasis, it may again be mentioned that the decision lists comprise sequential lists, or time lines, of tasks that are to be accomplished in a preselected chronological manner by videotape recorder mechanisms or time-base correctors that are connected to the editing device. Examples of time lines for use in the system of FIG. 3 are provided below. Within the time lines, two or more tasks may be scheduled for simultaneous execution.

As further shown in FIG. 3, editing device 11 includes conventional interpreter circuitry 45 that functions to place time line commands in a format compatible with code utilized in control system 21. Editing device 11 also includes a conventional input/output processor 47 to handle signal traffic between the editing device and controlled devices.

In the system in FIG. 3, the only device that is shown to be controlled directly be editing device 11 is videotape recorder control system 21; however, a number of different components, including several videotape recorder control systems, can be controlled by editing device 11. For purposes of controlling a multiplicity of such components, input/output processor 47 includes data buses 19A-D as previously described in conjunction with FIG. 1. Thus, a second control system essentially identical with control system 21 can be connected to data bus 19B, a third control system can be connected to data bus 19C, and so forth. In such a network, each control system could operate to control an individual videotape recorder mechanism and time-base corrector. In the cae where a number of components (i.e., control systems) are controlled from the same editing device, unique addresses are provided to each of the components. Such addresses are important for communication purposes so that each component to which communications are directed can be positively identified.

At this juncture, it should be appreciated that, while the primary purpose of the system of FIG. 3 is to employ editing device 11 to control time-base corrector 17 and recorder mechanism 23, the preferred embodiment employs control system 21 as an intermediary. In the overall system, the communications from editing device 11 to the time-base corrector 17 to proceed in two stages. The first stage of such communications is from editing device 11 to videotape recorder control system 21, and the second state is communication from control system 21 to time-base corrector 17. Likewise, any communications back from time-base corrector 17 to editing device 11 employ the videotape recorder control system 21 as an intermediary. Such intermediary usage of control system 21 is desirable even when commands for editing device 11 and time-base corrector 17 are written in the same programming language because, even in such a situation, instructions for time-base corrector 17 are difficult to write Although such difficulties might be partially overcome by rewriting software for time-base correctors, such a task is unnecessary when recorder control system 21 is used as a translator.

In the system in FIG. 3, control system 21 includes a microprocessor-based remote control 51, a microprocessor-based master controller 55, a time line section 53 for recorder mechanism 23, and a time line section 56 for time-base corrector 17. Master controller 55 is connected to control videotape recorder mechanism 23, and remote control 51 is connected to control time-base corrector 17. Master controller 55 is conventional in videotape recorders such as the one sold under the trademark VPR-3 by Ampex Corporation. In operation, master controller 55 functions to coordinate control signals from local control panel 35 with videotape recorder mechanism 23. Time lines 53 and 56 are generally identical except that instructions within the respective time lines are uniquely identified as either being for execution by time-base corrector 17 or recorder mechanism 23. Remote control section 51 is, as known in videotape recorders such as the Ampex VPR-3 recorder, generally the same as master controller 55 and operates in tandem therewith. To achieve coordination between master controller 55 and remote control section 51, various signals are exchanged between master controller 55 and remote control section 51 indicative of the status of recorder mechanism 23 and time-base corrector 17 respectively, as indicated in the drawing.

The system in FIG. 3 further includes local control panel 35 to provide control of time-base corrector 17 in real time. Thus, in FIG. 3 local control panel 35 transmits signals designated as "level control in" signals and receives signals designated as "level control out" signals from remote control panel 51. These signals can be understood to represent the levels of selected video signal parameters that are adjusted by time-base corrector 17 via local control panel 35 in real time. In other words, video signal parameters that are adjusted through control panel 35 are executed when made and cannot be scheduled in advance via a time line as can instructions entered by editing device 11. To coordinate the real-time video signal level adjustments that are entered at local control panel 35 with the scheduled instructions entered via editing device 11, an over-ride function is provided as will be described in detail later herein.

At this juncture, various advantages of including local control panel 35 within the system can be appreciated. One advantage is that the levels and other adjustments made remotely, sometimes referred to as "set-ups", can be viewed locally. Also, in conjunction with the over-ride feature, the set-ups can be changed locally, if desired, via local control panel 35.

General operation of the system of FIG. 3 can now be described. As a first step, selected control instructions are entered on data entry device 31 to control operation of time-base corrector 17 and videotape recorder mechanism 23. As is typical with such input devices, the instructions can be displayed, amended, re-arranged and otherwise manipulated at the discretion of the user to provide selected lists, or schedules, of the instructions for both recorder mechanisms and time-base correctors. After the instruction lists are compiled to the satisfaction of the user, data entry device 31 is operated to forward the schedules of instructions to editing device 11. The pre-processor 41 in editing device 11 operates to pre-process the schedules and then to store the schedules, or decision lists, of instructions.

At some time preceding the time that the videotape recorders and time-base correctors associated with editing device 11 are to operate, the schedules of instructions are forwarded to the control systems for the recorders. In practice, as previously mentioned, each of the recorder control systems would be provided with a unique address; thus, each particular recorder control system would receive only the time-line schedules that are intended to control the recorder mechanism and time-base corrector associated with that particular recorder control system. In the following, reference will be made to control system 21 as typical of a plurality of videotape recorder control systems that receive instructions from editing device 11. Thus, in control system 21, the schedules of instructions received from editing device 11 for recorder mechanism 23 are stored in time line 53 and the schedule of instructions for time-base corrector 17 are stored in time line 56.

As videotape is replayed by recorder mechanism 23, selected instructions from time line 53 are dispatched to the recorder mechanism and instructions for time line 56 are dispatched to time-base corrector 17. The dispatching of such instructions is controlled by master controller 55 in coordination with remote control 51 so that the instructions are placed proper format for execution by recorder mechanism 23 and time-base corrector 17. Once editing device 11 is ready to execute an operation such as an edit, it issues a load and run command to time lines 53 and 56. Once these commands are issued, recorder mechanism 23 and time-base corrector 17 will operate to carry out the actions programmed into their buffers at the programmed times. Thus, while recorder mechanism 23 and time-base corrector 17 are executing the programmed actions, editing device 11 is free to carry out other activities. Then, as a videotape is replayed by recorder mechanism 23, video signals originating from the tape are manipulated and adjusted by time-base corrector 17 to provide video output signals having the adjusted properties desired by the operator of the editing system.

To further explain the communication processes between editing device 11 and time-base corrector 17, an example will be provided of the first stage of the communications, namely communication between editing device 11 and control system 21. More particularly, the following is an example of use of a time line at editing device 11 to schedule events for recorder mechanism 23. For purposes of this example, suppose the following sequence of events is desired:

Event

1. One second after the time line run is begun, the videotape recorder is commanded to "roll"
2. Two seconds after the roll command, the editor is placed in the insert mode with the color framer off.
3. Five seconds after the editor is in the insert mode, a channel record entry command is sent.
4. One second after channel record entry command, a channel exit command is sent.

The initial step in the process of the example is to clear the time line buffers for data entry. In practice this is accomplished by issuing a TCLEAR[06]command. The next step is to load the time line tuffers with the scheduled actions and the scheduled times of occurrence. In this example, the first time line buffer is set to eleven seconds, but it could be set to any selected time. With regard to this example, it should be understood that, in the field of videotape recording technology, videotaped events are usually described as occurring within a given number of frames of video signal information. Thus, it is known in videotape recording technology to sequentially locate frames by vertical interval time code, horizontal time code, or tape timers. In the latter case, tape travel is monitored by a electro-mechanical device. With such techniques, a frame on a videotape might be designated, for example, s 00:01:08:15, indicating that the frame follows an arbitrarily-selected first frame by 1 minute 8.5 seconds when the tape is played at an operating speed of thirty frames per second. In this code the first two digits designate hours in decimal notation, the next two digits designate minutes, the next two digits designate seconds, and the final two digits designate numbers of frames. With the foregoing in mind, the steps in the buffer loading sequence are as follows:

STEP 1: set buffer time to 00:00:11:00 and write the action "roll."
STEP 2: set buffer time to 00:00:13:00 and write the actions "editor insert" and "color framer off."
STEP 3: set buffer time to 00:00:18:00 and write the action "entry video."
STEP 4: set buffer time to 00:00:19 00 and write the action "exit video."
STEP 5: load the time line with the time 00:00:10:00 and increment this time until told to stop.

Figure 4:
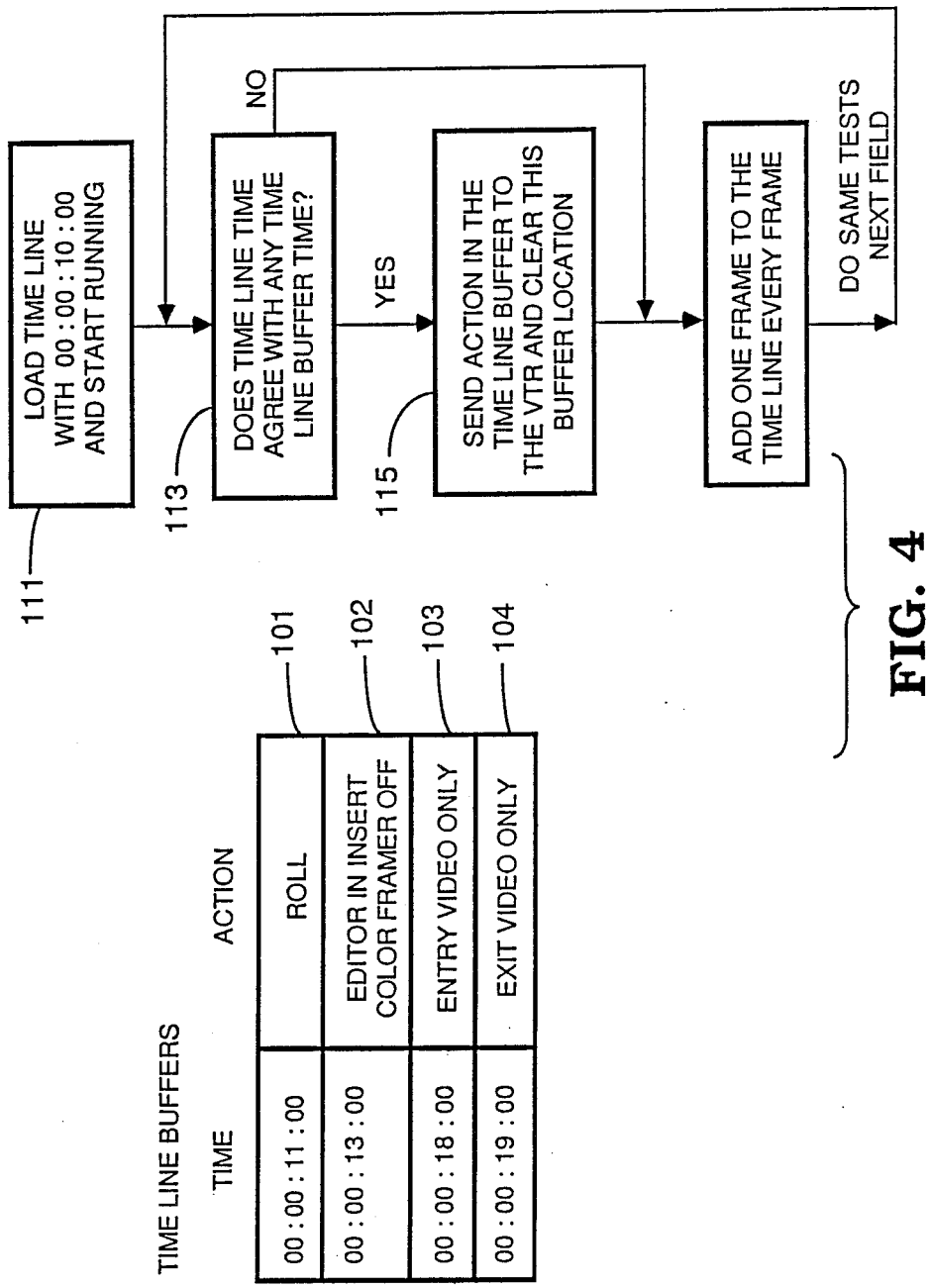
FIG. 4 is a functional diagram that illustrates steps of a process according to the present invention.

The preceding process is generalized diagrammatically in FIG. 4, wherein buffers 101 through 104 are shown as containing both timing code and the commands that are to be executed. With the buffers 101-104 loaded, the first step in execution of the process, designated by block 111, is to load a preselected timing code into the time line and place the system in operation. After the system has begun operation, each of the buffers 101-104 is queried to determine whether the stored timing code agrees with the time line. In FIG. 4, the inquiry steps are indicated by block 113. If none of the buffers 101-104 is found to contain the same timing code as the time line, the timing code of the time line is incremented by one frame on the next frame boundary and the inquiry process is repeated. In FIG. 4, this action is indicated by block 115. For the numerical values given in the first example above, the incrementations would change the time line from 00:00:11:00 to 00:00:11:01, then to 00:00:11:02, and so forth. After a number of such incrementations, a match will normally be found between the code in the time line and a code stored in one of the buffers 10-104. When the particular buffer containing the matching time code has been identified, the instruction in that buffer will be transmitted to a videotape recorder mechanism. After a transmission from a buffer, the buffer location is cleared and then the searching process is continued by sequentially incrementing the time code in the time line and again searching the buffers for matching code.

In practice, the following commands have been utilized in time lines in devices including ones sold under the trademark ACE Editor by Ampex Corporation. In such devices, the time lines have been used to schedule functions of videotape recorder devices such as ones known as the Ampex VPR-3 sold by Ampex Corporation of Redwood City, California. The code for the commands is a matter of choice and the codes can substantially vary depending upon the programming language and conventions employed.

| COMMAND | | VTR COMMAND DESCRIPTIONS | |
|---|---|---|---|
| (0 × 03) | DFER: | Defer command(s) until a given time code in the time line. | |
| | | bytes 0-3: | Time code number at which the command(s) are to be executed. |
| | | byte 4: | Count of the number of bytes of the command message that are to be deferred. |
| | | byte 5: | Deferred command(s). |
| (0 × 05) | TSTOP: | Stop the time line. | |
| (0 × 06) | TCLEAR: | Clear the time line buffers. In response to this command, all events associated with the time line are cleared from the buffers. | |
| (0 × 07) | TRUN: | Load and run the time line. | |
| | | bytes 0-3: | Binary-coded decimal code for the start position for the time line. |
| (0 × 01) | READY: | Put tape transport into ready. | |
| | | byte 0: | #0 off |
| | | | #1 on |
| (0 × 03) | CF: | Control color framer. | |
| | | byte 0: | #0 off |
| | | | #1 on, normal |
| | | | #2 on, inverted |
| (0 × 04) | LTC: | Control longitudinal time code. | |
| | | byte 0: | #0 off |
| | | | #1 on |
| (0 × 05) | VITC: | Control vertical interval time code. | |
| | | byte 0: | #0 off |
| | | | #1 on |
| (0 × 06) | EDMODE: | Control edit mode. | |
| | | byte 0: | #0 off |
| | | | #1 insert |
| | | | #2 assemble |
| | | | #3 rehearse |
| | | | #4 crash record |
| (0 × 07) | ENABLE: | Control channel enable. | |
| | | bit 0: | Video channel record |
| | | bit 1: | Audio 1 record |
| | | bit 2: | Audio 2 record |
| | | bit 3: | Audio 3 record |
| | | bit 4: | Audio 4 record |
| | | bit 7: | Time code record |
| (0 × 08) | TCMODE: | Control time code generator. | |
| | | byte 0: | #0 hold |
| | | | #1 start running now |
| (0 × 09) | SPEED: | Control transport speed in the current mode. | |
| | | BYTES | speed magnitude |

-continued

| COMMAND | | VTR COMMAND DESCRIPTIONS | |
|---|---|---|---|
| | | | 0-1: |
| (0 × 0C) | STOP: | Stop. | |
| (0 × 0D) | PLAY: | Play. | |
| (0 × 0E) | ROLL: | Play and synchronize to external reference. | |
| (0 × 0F) | TSO: | Play tape speed override. | |
| | | bytes 0-1: | Magnitude |
| | | | Linear Scale: |
| | | | −511 = 1× play − 15% |
| | | | 0 = 1× play |
| | | | 511 = 1× play + 15% |

To further explain the communication process between an editing device and time-base corrector, an example will now be provided of commands entered in a time line at a device such as an ACE Editor (available from Ampex Corporation) to schedule operation of a time-base corrector such as included in video processor devices sold under the trademark Zeus by Ampex Corporation. Again, it should be understood that the code for the commands is a matter of choice and codes can substantially vary depending upon the programming language and conventions employed.

| COMMAND NUMBER | | DESCRIPTION OF VIDEO PROCESSOR COMMAND | |
|---|---|---|---|
| (0 × 36) | ZDFER: | Defer the following command(s) until a given time code on the time line occurs. | |
| | | bytes 0-3: | Time code at which commands are to be executed. |
| | | byte 4: | Count of the number of bytes of the command messages that are to be deferred. |
| | | byte 5: | Deferred command(s). |
| (0 × 38) | ZTSTOP: | Stop the time line. | |
| (0 × 39) | ZTCLEAR: | Clear the time line buffers. | |
| (0 × 3A) | ZTRUN: | Load and run the time line. | |
| | | bytes 0-3: | binary coded decimal time code of the start position for the time line. |
| (HEX) | | | |
| (01) | | Control video level. | |
| | | bytes 0-1: Magnitude | |
| | | linear scale: | |
| | | FFXXH = return to last increment or decrement of value | |
| | | 6000H = + 3 db | |
| | | 4000H = unity | |
| | | 0000H = no video | |
| | | 8XX1H = increment of present value by 1 unit | |
| | | 8XX0H = decrement of present value by 1 unit | |
| (02) | | Control black level. | |
| | | Bytes 0-1: Magnitude | |
| | | linear scale: | |
| | | FFXXH = return to last increment or decrement of value | |
| | | 7F00H = maximum black level | |
| | | 4000H = unity (80H per int unit) | |
| | | 0000H = minimum black level | |
| | | 8XX1H = increment of present value by 1 unit | |
| | | 8XX0H = decrement of present value by 1 unit | |
| (03) | | Control chroma level. | |
| | | bytes 0-1: Magnitude | |
| | | linear scale: | |
| | | FFXXH = return to last increment or | |

-continued

```
         decrement of value
         5A80H = + 3 db
         4000H = unity (80H per int unit)
         0000H = no chroma (black and white)
         8XX1H = increment of present value by 1
           unit
         8XX0H = decrement of present value by 1
           unit
(04)  Control chroma phase.
         bytes 0-1: Magnitude
           linear scale:
           FFXXH = return to last increment or
           decrement of value
           7F80H = + 20 degrees (80H per int unit)
           4000H = 0 degrees (unity)
           0000H = 20 degrees
           8XX1H = increment of present value by 1
             unit
           8XX0H = decrement of present value by 1
             unit
(05)  Control output sync to burst subcarrier
         phase.
         bytes 0-1: Magnitude
           linear scale:
           FFXXH = return to last increment or
             decrement of value
           7E00H = + 180 degrees
           4000H = 0 degrees (unity)
           0000H = 180 degrees (80H per unit)
           8XX1H = increment of present value by 1
             unit
           8XX0H = decrement of present value by 1
             unit
(06)  Control subcarrier phase.
         bytes 0-1: Magnitude
           linear scale:
           FFXXH = return to last increment or
             decrement of value
           59F0H = 359.75 degrees
           2CF0H = 180 degrees (10H per unit)
           0000H = 0 degrees
           8XX1H = increment of present value by 1
             unit
           8XX0H = decrement of present value by 1
             unit
(07)  Control horizontal phase.
         bytes 0-1: Magnitude
           linear scale:
           FFXXH = return to last increment or
             decrement of value
           7E00H = + 5 Usec ( + 21)
           3FE0H = 0 Usec
           0000H = − 5 Usec (−42)
           8XX1H = increment of present value by 1
             unit
           8XX0H = decrement of present value by 1
             unit
(08)  Control horizontal picture.
         bytes 0-1: Magnitude
           linear scale:
           FFXXH = return to last increment or
             decrement of value
           4800H = + 4.5 cycles
           25D0H = unity
           0000H = − 4.5 cycles
           8001H = increment of present value by 1
             unit
           8000H = decrement of present value by 1
             unit
(09)  Control vertical picture position.
         bytes 0-1: Magnitude
           linear scale:
           FFXXH = return to last increment or
             decrement of value
           4000H = + 2 lines
           2400H = unity
           0000H = − 2 lines
           8001H = increment of present value by 1
             unit
           8000H = decrement of present value by 1
             unit
```

In practice, as many as ten different functions of a time-base corrector have been controlled from an editing device according to the process described above. In such situations, where multiple functions are being controlled, it is preferred practice to continuously communicate the information regarding the levels of the function parameters at a rate of one function per frame. Thus, for example, information regarding the level of the parameters for the first control function would be transmitted during the period of a first frame, information regarding the level of the parameters for the second control function would be transmitted during the second susequent frame, and so forth. By providing the control information in such a segmented manner, overloading of the logic circuitry in the system during frame intervals is avoided. Moreover, as a result of such practice, transmission of control information is provided even when control levels are not changed. Such practice has proven to minimize problems with noise and other spurious signals that might cause unintended changes in control settings. Further, by transmitting control information even when control function levels are not changed, erroneous settings caused by spurious signals are periodically and automatically corrected.

Also in practice, it is desirable to provide for overriding the above-described frame-by-frame sequence in the event that the level of any one of the control functions is varied. As an example of an override situation, consider a system where the various control functions for a time-base corrector are designated by letters A-K, and frames of video are designated by numbers 1-N. Further for purposes of this example, assume that transmission of information regarding the level of parameters of the control function"A" coincides with a frame "1", transmission of information as to the level of parameters of function "B" coincides with frame "2", and so forth. Next, suppose that information regarding the level of parameter of function "F" has been transmitted in the period of the sixth frame and that a user of the system desires to make a change in the level of parameter of control function "B". In such a situation, a user of the system might, for example, enter a revised level parameters at local control panel 35 of FIG. 3. In such a situation, an override can be provided so that information regarding function "B" is transmitted during the period of the seventh frame. After such transmission, it is a matter of choice as to whether the system transmits information regarding the level of control "C" in the eighth frame, the level of the control "D" of the ninth frane, and so forth, or whether the system resumes transmitting information regarding the level of control "G" in the eighth frame, the level of control "H" in the ninth frame and so forth. In either case, the important point is that the transmission sequence is interrupted whenever a system user intentionally changes the level of a parameter of a control function.

At this juncture, it can be appreciated that the previously described system provides numerous advantages. As an example of one advantage, consider a situation where information on videotape contains various time displacement errors as well as frames that an editor desires to alter through adjustment of video signal parameters. The editor can, by employing the above-described systems and processes before the videotape is replayed through a videotape recorder, compile schedules of instructions signifying the desired adjustments. In the instruction schedules, control functions and levels for a time-base corrector can be planned such that, upon replay of the videotape, the time-displacement errors will be corrected and the desired video enhancements will be made. After completion of the compilation of the instruction schedules, the schedules are entered in editing device 11 and loaded into the time line buffers in time lines 53 and 56 (FIG. 3) in the manner previously described. Then, during replay of the original videotape, the scheduled corrections and modifications are automatically made to the video output signals. The modified output signals can then be recorded on a second videotape by a second videotape recorder and, as a result, the information recorded on the videotape is free of time-displacement errors and has the desired video enhancements. One benefit of the system is that the first videotape will remain unaltered and that a record will exist of the time line schedules and of the changes made in the original video information.

Another advantage of the previously described system is that information recorded on two or more videotapes can be combined according to predetermined schedules to produce information on another videotape that is modified and adjusted according to the schedules. Here again, the benefits of the system are that the information on the original videotape can remain unaltered and that a record exists of any changes made to the video information.

Another advantage of the previously described system is that it can be readily used in teleproduction studios without requiring substantial additional wiring. That is, control of time-base correctors by an editing device is accomplished through existing cables that connect the editing device to videotape recorders, and there is no need for specific cables between the editing device and the time-base correctors. This feature can be of substantial significance in teleproduction studios that employ numerous time-base correctors located remotely from editing devices.

An associated benefit of the previously described system is that it uses existing time line and translator capabilities of videotape recorders. In other words, tasks that require parallel or concurrent execution are distributed as sub-tasks among various videotape recorders. As a result, the ability of the editing device to schedule and execute concurrent or parallel tasks is effectively enhanced.

Although the present invention has been described with particular reference to the illustrated embodiments and although various alternatives have been discussed, such disclosure is not to be interpreted as limiting and modifications and alternative embodiments will become readily apparent to workers skilled in the art after having read the foregoing disclosure. For example, the system of FIG. 1 could employ time lines in each of the time-base correctors 17A–D. In such an embodiment, editing device 11 would transmit to time-base corrector 17A a complete schedule of commands that it is to execute and those commands would then be stored until the appropriate time for execution; likewise, complete schedules of commands would be transmitted to time-base correctors 17B–D and those commands would be stored by each of the correctors until the appropriate execution times. In view of such variations, and others, the appended claims should be interpreted as covering all of the various alternative embodiments as fall within the true spirit and scope of the present invention.

What is claimed is:

1. A method for controlling a time-base corrector with a videotape editing device comprising the steps of:

storing schedules of instructions in a videotape editing device;
   communicating selected ones of said scheduled instructions to a time-base corrector from the videotape editing device; and
   operating the time-base corrector to adjust the levels of video signals information processed by the time-base corrector according to said communicated instructions.

2. A method according to claim 1 wherein the schedules of instructions determine the time of execution of said adjustments to said levels for said video signal information.

3. A method according to claim 2 wherein the level controls for the time-base corrector are digital.

4. A method according to claim 3 wherein said digital controls provide adjustment of at least several of the following video signal parameters in response to said, instructions: video level, black level, chrominance level, chrominance phase, subcarrier phase, horizontal phase, input burst crossing select phase, horizontal blanking, vertical picture position, horizontal picture position, and frame positioning.

5. A method according to claim 3 wherein a second time-base corrector is operatively connected in communication with the videotape editing device, and wherein selected ones of the scheduled instructions are communicated to the second time-base corrector.

6. A method according to claim 3 wherein a plurality of time-base correctors is connected to the videotape editing device and selected ones of the instructions are communicated to selected ones of the time-base correctors of the plurality.

7. A method for employing a videotape editing device to control a time-base corrector paired in operative communication with a videotape recorder, comprising the steps of:

(a) providing schedules of instructions to an editing device;
   (b) communicating the schedules of instructions from the editing device to a control system for a videotape recorder mechanism, said schedules of instructions including instructions to be executed by a time-base corrector;
   (c) storing the schedules of instructions in the control system and then communicating selected ones of said instructions to said time-base corrector; and
   (d) operating the time-base corrector to execute said selected instructions to adjust video signal parameters of the video output signals of said videotape recorder mechanism during replay.

8. A method according to claim 7 wherein said selected instructions are executed by the time-base corrector substantially immediately following reception of the instructions.

9. A method according to claim 7 wherein instructions from one of said schedules are communicated from the control system to a videotape recorder mechanism for execution by the mechanism.

10. A method according to claim 7 wherein the schedules of instructions determine the time of execution of said adjustments to said video signal parameters.

11. A method according to claim 10 wherein the time-base corrector includes signal level controls that are digital.

12. A method according to claim 11 wherein said digital controls provide adjustment of at least several of the following video signal parameters in response to said instructions: video level, black level, chrominance level, chrominance phase, subcarrier phase, horizontal phase, input burst crossing select phase, horizontal blanking, vertical picture position, horizontal picture position, and frame positioning.

13. A method according to claim 12 wherein the schedules communicated to the control system further include instructions to be executed by a videotape recorder mechanism connected to the control system.

14. A method for employing a single videotape editing device to control at least two videotape recorders paired in operative communication with time-base correctors, comprising the steps of:
   (a) providing schedules of video signal manipulation instructions to an editing device;
   (b) from the editing device, communicating selected ones of said schedules of instructions to selected videotape recorder control systems;
   (c) storing said selectively communicated schedules of instructions in the videotape recorder control systems;
   (d) in accordance with the schedules, communicating selected ones of said scheduled instructions from the videotape recorder control systems to the time-base correctors with which the control systems are paired; and
   (e) at the time-base correctors, executing said instructions to manipulate video signal information at the output of videotape recorders with which the time-base correctors are paired.

15. A method according to claim 14 wherein selected instructions from said schedules are also communicated from the control systems to videotape recorder mechanisms for execution by the mechanisms.

16. A method according to claim 14 wherein the schedules of instructions determine the time of execution of said adjustments to said video signal parameters.

17. A system for controlling a time-base corrector of the digital type comprising:
   means to store preselected schedules of instructions; and
   time-base corrector means to receive communicated instructions and to adjust video signal information levels at the output of a videotape recorder according to said instructions.

18. A system according to claim 17 wherein the time-base corrector means includes means to store a time line schedule of said instructions, means to read the time line and to execute said instructions at scheduled times.

19. A system for controlling a time-base corrector of the digital type comprising:
   means to store preselected schedules of instructions;
   means to communicate instruction from said schedules in serial sequence; and
   time-base corrector means to receive communicated instructions and to adjust video signal information levels at the output of a videotape recorder according to said instructions.

20. A system according to claim 19 wherein the level controls for the time-base corrector are digital.

21. A system according to claim 19 wherein said digital controls provide adjustment of at least several of the following video signal parameters in response to said instructions: video level, black level, chrominance level, chrominance phase, subcarrier phase, horizontal phase, input burst crossing select phase, horizontal blanking, vertical picture position, horizontal picture position, and frame positioning.

22. A system employing a video-tape editing device to schedule and control a time-base corrector, comprising:
   (a) videotape editing means to store at least one schedule of instruction for setting video signal information levels of a time-base corrector;
   (b) videotape recorder control means to receive and store said at least one schedule of instructions from said videotape editing means; and
   (c) time-base corrector means to receive instructions from the videotape recorder control means and to execute said instructions to adjust video signal information levels.

23. A system according to claim 22 wherein the level controls for the time-base corrector are digital.

24. A system according to claim 23 wherein said digital controls provide adjustment of at least several of the following video signal parameters in response to said instructions: video level, black level, chrominance level, chrominance phase, subcarrier phase, horizontal phase, input burst crossing select phase, horizontal blanking, vertical picture position, horizontal picture position, and frame positioning.

25. A system employing a single video-tape editing device to schedule and control at least two videotape recorders connected in operative communication with time-base correctors, comprising:
   (a) videotape editing means to store schedules of instruction for setting video signal information levels;
   (b) at least two videotape recorders connected to the videotape editing means to receive schedules of instructions that are to be performed by time-base correctors associated with the recorders; and
   (c) time-base corrector means connected to receive instructions from respective ones of the at least two videotape recorders, the respective time-base correctors being operable to execute said instructions to adjust video signal information levels at the outputs of the recorders with which the time-base correctors are associated.

26. A system according to claim 25 wherein each time-base corrector of the plurality is provided with a unique address.

* * * * *